(12) United States Patent
Brandinger et al.

(10) Patent No.: US 6,605,796 B2
(45) Date of Patent: Aug. 12, 2003

(54) LASER BEAM SHAPING DEVICE AND APPARATUS FOR MATERIAL MACHINING

(75) Inventors: Jay J. Brandinger, Pennington, NJ (US); Brian D. Hoffman, Princeton, NJ (US); Edward T. Polkowski, Lloyd Harbor, NY (US)

(73) Assignee: Westar Photonics, Pennington, NJ (US)

(*) Notice: Subject to any disclaimer, the term of this patent is extended or adjusted under 35 U.S.C. 154(b) by 54 days.

(21) Appl. No.: 09/866,058

(22) Filed: May 25, 2001

(65) Prior Publication Data

US 2002/0008091 A1 Jan. 24, 2002

Related U.S. Application Data

(60) Provisional application No. 60/207,115, filed on May 25, 2000.

(51) Int. Cl.[7] .............................................. B23K 26/06
(52) U.S. Cl. .......................... 219/121.67; 219/121.74
(58) Field of Search ....................... 219/121.67, 121.68, 219/121.69, 121.7, 121.71, 121.72, 121.73, 121.74

(56) References Cited

U.S. PATENT DOCUMENTS

| | | | |
|---|---|---|---|
| 4,744,615 A | | 5/1988 | Fan et al. |
| 5,041,862 A | | 8/1991 | Rossman et al. |
| 5,539,568 A | * | 7/1996 | Lin et al. |
| 5,676,866 A | * | 10/1997 | in den Baumen et al. |
| 5,864,430 A | | 1/1999 | Dickey et al. |
| 5,925,271 A | | 7/1999 | Pollack et al. |
| 6,028,689 A | * | 2/2000 | Michalicek et al. |
| 6,037,564 A | * | 3/2000 | Tatah |
| 6,040,935 A | * | 3/2000 | Michalicek |
| 6,293,680 B1 | * | 9/2001 | Bruns |
| 6,379,510 B1 | * | 4/2002 | Kane et al. |
| 6,404,534 B1 | * | 6/2002 | Chin et al. |

FOREIGN PATENT DOCUMENTS

JP       08174242 A   *  7/1996

* cited by examiner

Primary Examiner—Samuel M. Heinrich
(74) Attorney, Agent, or Firm—Woodbridge & Associates, PC; Richard C. Woodbridge

(57) ABSTRACT

A programmable apparatus for laser beam shaping including a preprogrammable mircomirror array produces a spatial energy distribution suitable for accurately and rapidly marking, machining and processing materials. The preprogrammed micromirror array redistributes the laser output beam energy to produce a desired two-dimensional machining pattern on a work piece. The energy pattern created by the preprogrammed micromirror array is changeable between successive pulses of the laser to create accurate, complex three-dimensional machined shapes in a work piece not easily achieved by conventional machining systems. A special application of this invention is laser beam shaping to produce a uniform spatial energy distribution, i.e. homogenizing the beam from a laser with non-uniform energy distribution. Continuous adjustment of beam shaping is provided to maintain beam homogenization in accordance with changes in laser beam output energy profile.

20 Claims, 10 Drawing Sheets

VOLTAGE APPLIED TO ACTUATOR

SIMPLE APERTURING

X DISTRIBUTION

X BEAM PROFILE

Y DISTRIBUTION

APERTURING & IMAGING

X DISTRIBUTION

Y DISTRIBUTION

LASER BEAM SHAPING DEVICE AND APPARATUS FOR MATERIAL MACHINING

CROSS REFERENCE TO RELATED APPLICATIONS

This application claims the priority of U.S. Provisional Application Ser. No. 60/207,115 entitled "Laser Beam Shaping Device and Apparatus for Material Machining" filed on May 25, 2000 the entire contents and substance of which are hereby incorporated in total by reference.

BACKGROUND OF THE INVENTION

1. Field of the Invention

The invention relates to a device in which a preprogrammed micromirror array redistributes the laser output beam energy to produce a desired two-dimensional machining pattern on a work piece.

2. Description of Related Art

It is known that in laser machining, particular importance is attached to both the quality of the beam produced by a laser and the shaping of that beam for the desired use. The laser output beam quality and shape determine the quality, quantity and efficiency of work piece machining. In many lasers, the output energy distribution over the beam profile is nonhomogeneous and if not reshaped to produce a uniform distribution would result in uneven machining over the work piece surface. Various approaches have been used to homogenize a laser beam profile to solve this problem.

One of the simplest devices to produce a homogenized beam profile is described by Fan et al. in U.S. Pat. No. 4,744,615 issued on May 17, 1988. In the Fan et al. patent, a coherent laser beam having non-uniform spatial intensity distributions is transformed by a multi-mirror tunnel in which the laser energy is reflected off the multiple mirrors such that there is a uniform energy profile at the exit of the tunnel.

U.S. Pat. No. 5,041,862, Rossman et al. "Lens Screen", issued on Aug. 20, 1991 discloses a two-dimensional optical lenslet array that divides the laser beam into beamlets, which are subsequently reimaged to overlap their individual beamlet profiles producing an homogenized beam profile. Similarly, reshaping and homogenization of a laser beam is conventionally performed by XMR cylindrical lens arrays like 2Z17-E0125 or monolithic lens arrays of crossed cylindrical lenses. The simplest set-up consists of an array of crossed cylindrical followed by a focusing lens. The rectangular lenslets of the array have a clear aperture of rectangular shape. Collimated light coming into the lens array will be divided by the lenslets into beamlets of a rectangular beam profile. Each beamlet is focused by the lens array and diverges after the focal plane. The convex lens refracts each beamlet so that it fills the focal of the optical axis.

In addition, the prior art also includes:

U.S. Pat. No. 5,864,430, Dickey et al entitled "Gaussian beam profile shaping apparatus, method therefor and evaluation thereof", issued on Jan. 26, 1999 discloses a method and apparatus for mapping a Gaussian beam into a beam with uniform irradiation profile by exploiting the Fourier transform properties of lenses.

U.S. Pat. No. 5,925,271 to Pollack, et al. and entitled, "Laser beam shaping device and process including rotating mirror", issued Jul. 20, 1999. discloses a system in which one stationary beam shaping mirror and at least one rotary mirror is used to achieve an elliptical beam on a surface.

German patent DE 19724060A1 describes an apparatus which creates a homogenized excimer laser beam by splitting the beam, inverting the profile and coaxial recombination of the inverted beam profile with the original profile. The practical implementation of this beam homogenizer is manufactured by Micro/Las GMBH.

The foregoing patents describe technology, which accomplish beam shaping with fixed and/or rotating optical components and are capable of changing beam profile shape by mechanically replacing or reorienting the optical components.

Homogenized laser beams are used for a variety of materials machining purposes including drilling, contouring surfaces, cutting, scribing, trimming and pattern depositions. Typically, Co2 lasers are used for scribing, drilling and machining. Excimer lasers are used for film ablation, flex circuits and relief cutting. YAG lasers are used for trimming resistors, capacitors, marking and cutting of metals, semiconductors and absorptive synthetics.

In the case of U.S. Pat. No. 5,676,866 to Baumen et al, an apparatus is disclosed that creates an array of beamlets, which are individually deflected on to a work piece to simultaneously drill holes at different points. A beam homogenizer is described, for example, in U.S. Pat. No. 5,041,862, Rossman et al. for the purpose of making certain that the array of machining beamlets all have the same intensity.

Laser beam machining with uniform beam profiles requires beam homogenization when the laser output beam energy profile is non-uniform. Further, changes in patterns for laser machining of a work piece is limited to changes/adjustments of optical components and or mechanical displacements of the work piece.

The prior art does not appear to disclose or suggest a suitable a method of laser beam homogenization and work piece shaping that has the ability to provide high speed, high resolution, and complex pattern laser beam machining of a work piece.

SUMMARY OF THE INVENTION

Briefly described, the invention combines the function of laser beam homogenization with shaping of the beam using a preprogrammed micromirror array device to produce a specified spatial energy distribution that can rapidly and accurately machine a work piece.

A preprogrammed thin film micromirror array (TMA) has individually addressable and moveable mirrors capable of redistributing the laser output beam energy to produce a desired two-dimensional machining pattern. Simple and complex predetermined energy patterns can be created and rapidly changed. Different patterns can be generated on successive laser energy pulses, both in energy distribution and geometric location, to create accurate, complex three-dimensional machining of a work piece, not easily achieved by conventional machining techniques. An electronic tracking system is included to precisely align the laser energy patterns with work piece features/indices.

A special application of the invention is laser beam homogenization, i.e. laser beam shaping, to produce a uniform spatial energy distribution from a laser with non-uniform energy distribution. The disclosed invention provides automatic, continuous adjustment of beam shaping to maintain homogenization in accordance with changes in laser beam output energy profile not available from fixed optical systems.

The invention is best understood from the following detailed description when read in connection with the accompanying drawings.

DETAILED DESCRIPTION OF THE PREFERRED EMBODIMENT

During the course of this description like numbers will be used to identify like elements according to the different views that illustrate the invention.

Figure 1A:
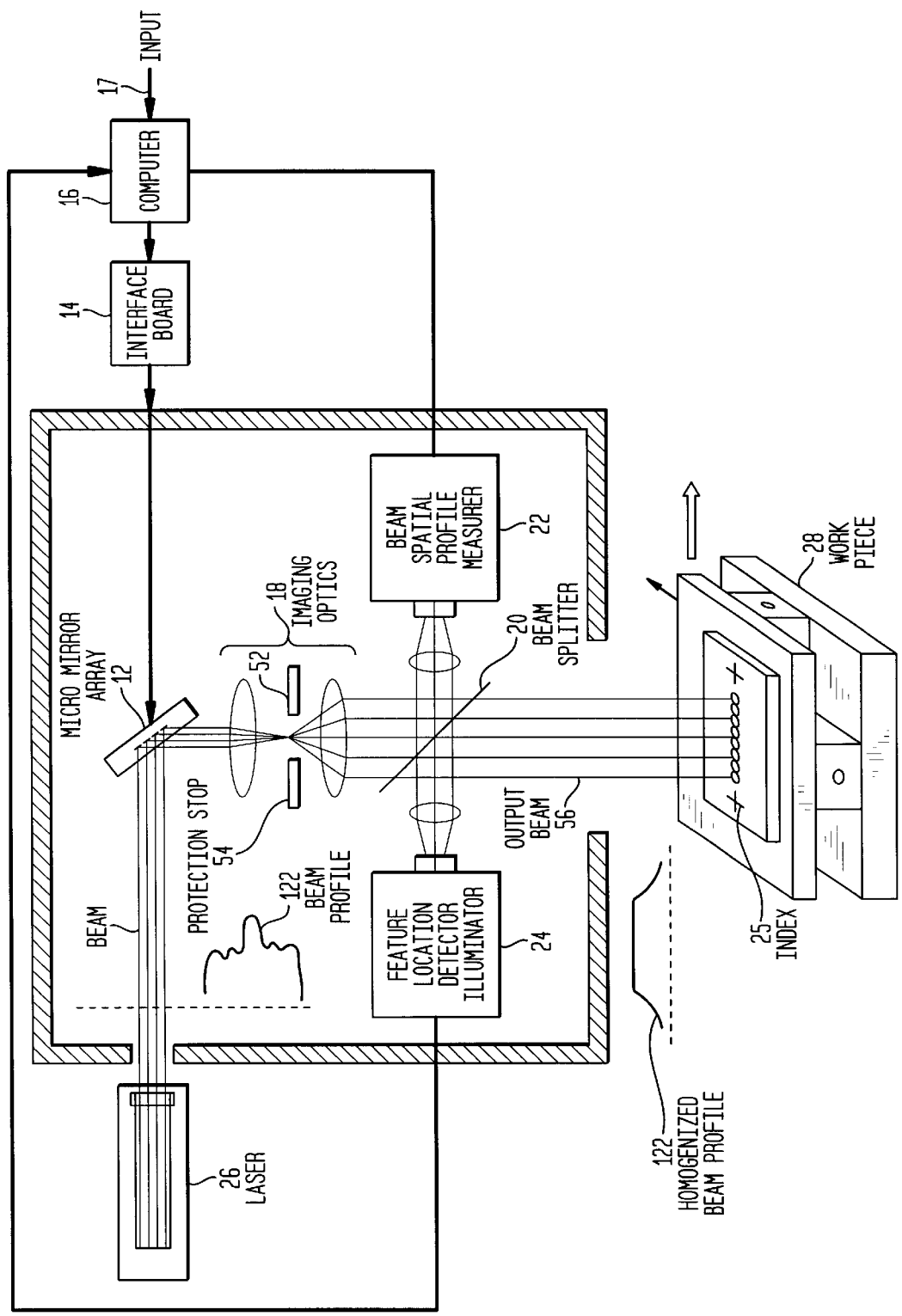
FIG. 1A is a schematic diagram of the apparatus to flexibly produce predetermined laser beam energy profiles.
Figure 1B:
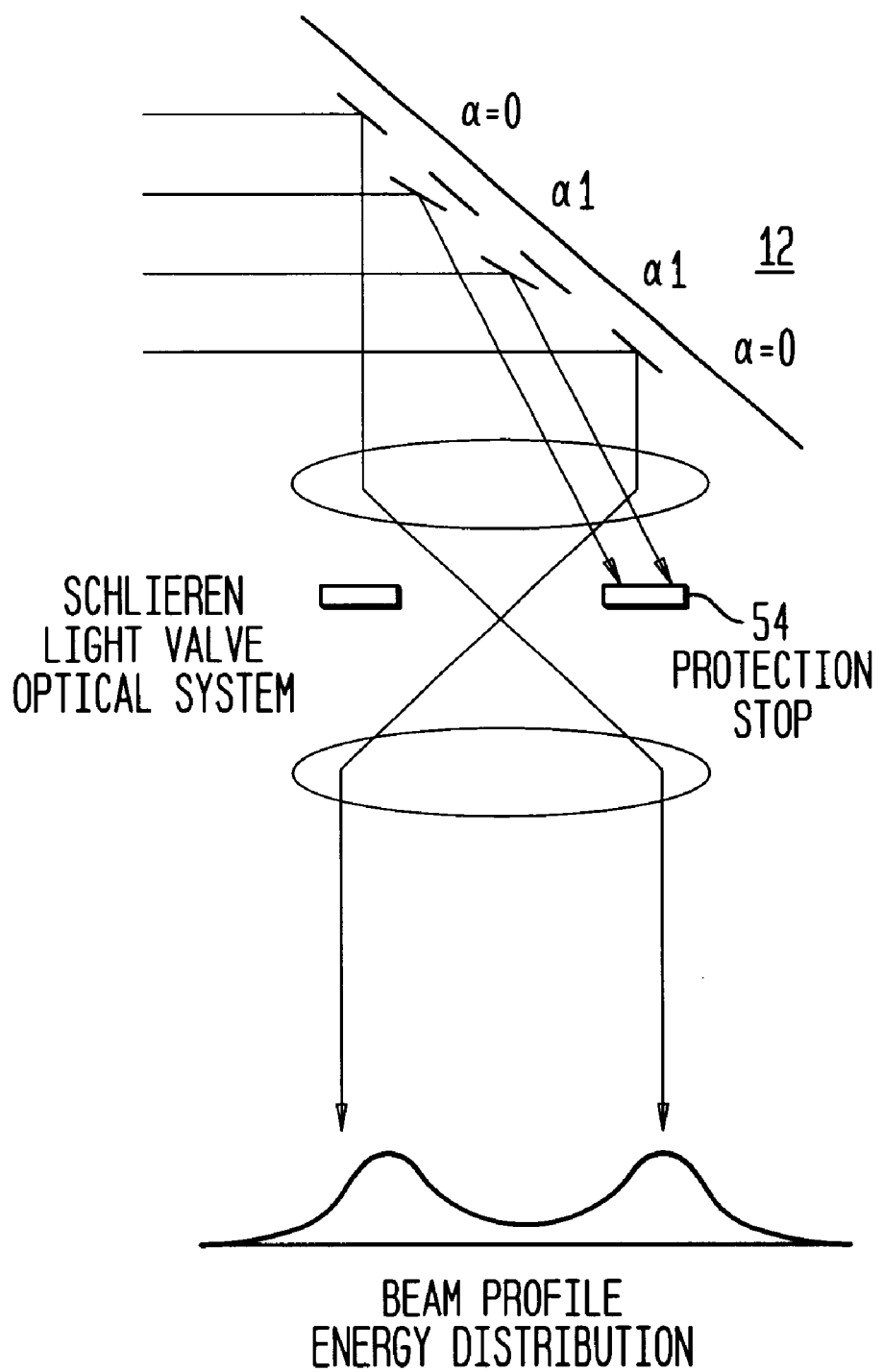
FIG. 1B is a schematic diagram of the Schlieren optical system illustrating the beam profile that results from various micromirror tilt angels.

The apparatus for laser machining 10 according to the preferred embodiment of the invention illustrated in FIG. 1 includes a thin-film micromirror array 12, an interface board 14, a computer 16, an input 17, imaging optics 18, beam splitter 20, beam spatial profile measurement 22, feature location detector & illuminator 24, a laser 26 and work piece 28. Acceptable thin-film micromirror arrays 12 are made by Daewoo Electronics Co. Ltd. Korea under the trademark "Thin-film Micromirror Array" (TMA) and other MEMS device manufacturers.

Figure 2A:
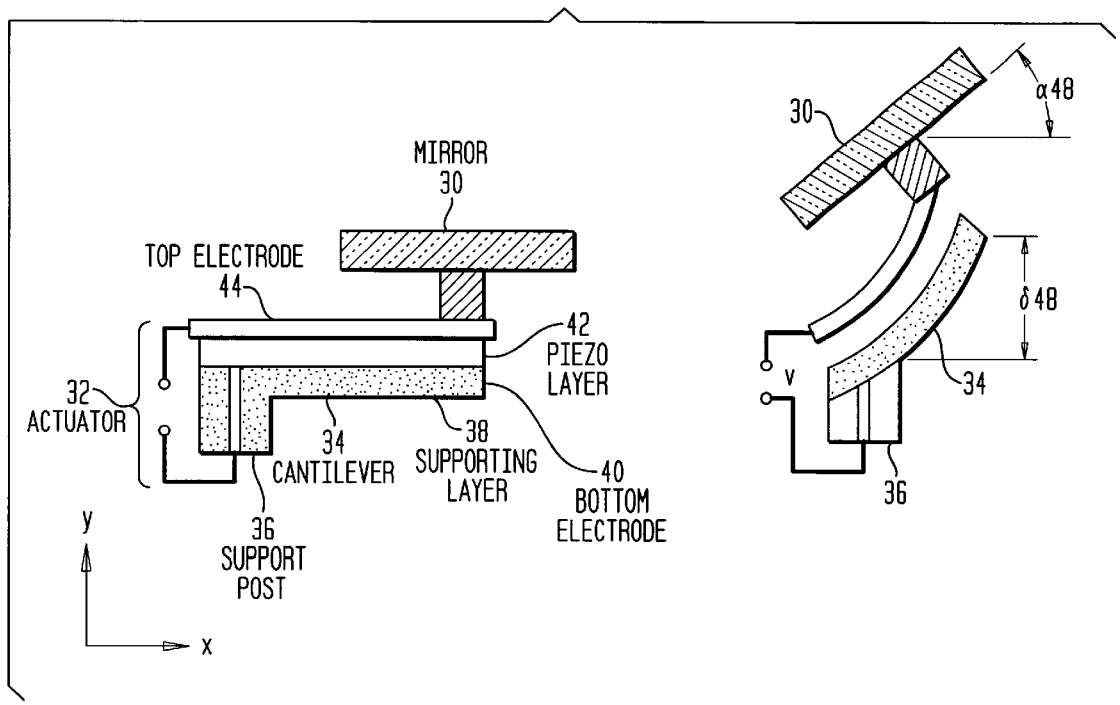
FIG. 2A illustrates the operation of a single micromirror.

The TMA, thin-film micromirror array 12, is an array of 1024×768 mirrors, each mirror measuring 49 microns×49 microns, with a panel size of 2.54 inches diagonal. The TMA is a particular kind of reflective spatial modulator. The TMA pixel is a monolithically integrated MEMS device fabricated over a simple PMOS switch. Each pixel consists of a mirror and an actuator as shown in FIG. 2A. Each aluminum mirror 30 has high reflectivity (better than 90%) and excellent flatness for high optical efficiency (fill factor of 94%), and the actuator 32 has linear and fast response times (less than 25 microseconds), as well as mechanical and electrical reliability (tested with no failures to 0.5×1011 cycles).

Figure 2B:
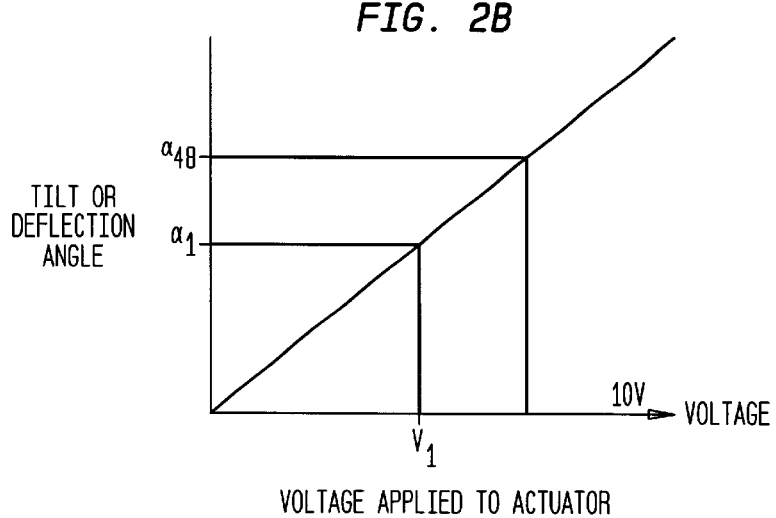
FIG. 2B is a graph of micromirror tilt angle versus the applied voltage to the piezo electric actuator.

The TMA uses thin film piezoelectric actuators 32 in the form of micro-cantilevers. As shown in FIG. 2, a mirror 30 is connected to the cantilevers 34 themselves through a support post 36. The cantilevers 34 themselves are anchored to the underlying substrate. A cantilever consists of the supporting layer 38, bottom electrode 40, piezoelectric layer 42 and top electrode 44. When an electric field is applied between the two electrodes 40 and 44, the piezoelectric 42 layer shrinks in the horizontal direction and expands in the vertical direction. Since the neutral plane of the cantilever 34 shifts toward the bottom of the electrode due to thickness of the supporting layer 38, the mechanical strain of the piezoelectric layer causes vertical deflection delta 46, of the cantilever 34 and a tilt of angle alpha 48 of the mirror 30 on top of it. The mirrors in FIG. 1A are shown at various tilt angles in accordance with the computer 16, preselected energy distribution patterns.

Figure 3A:
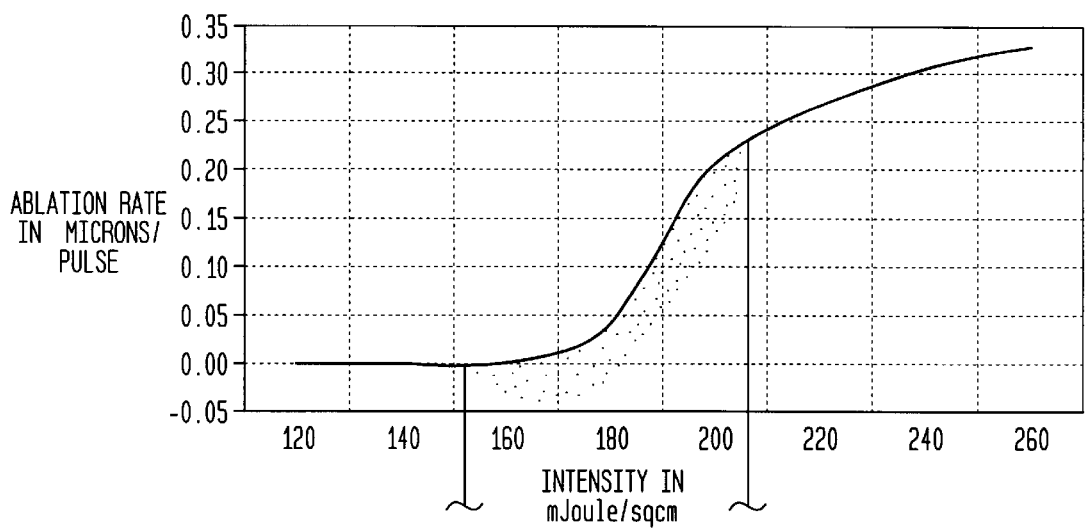
FIGS. 3A and 3B illustrate the relationship between mirror angle, laser intensity and material ablation rate.
Figure 3B:
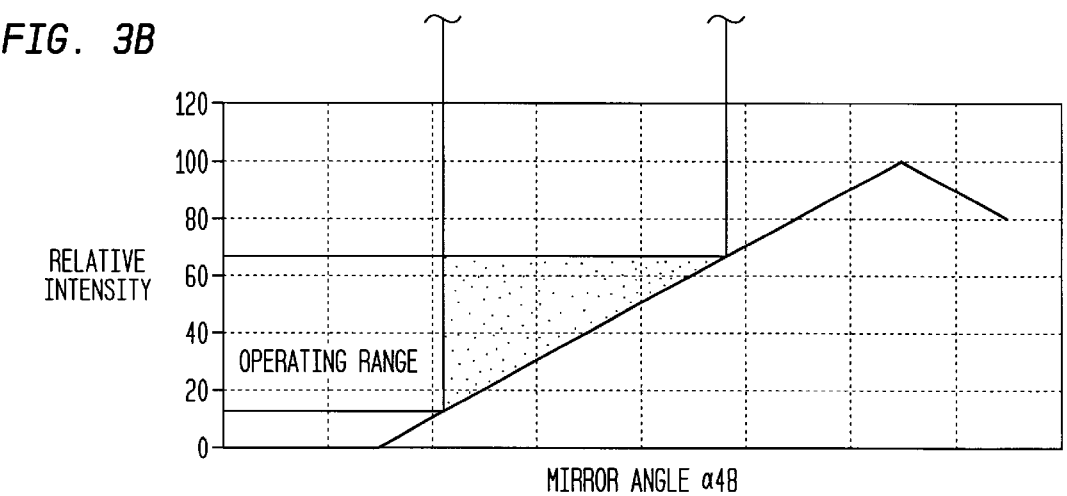
Figure 4A:
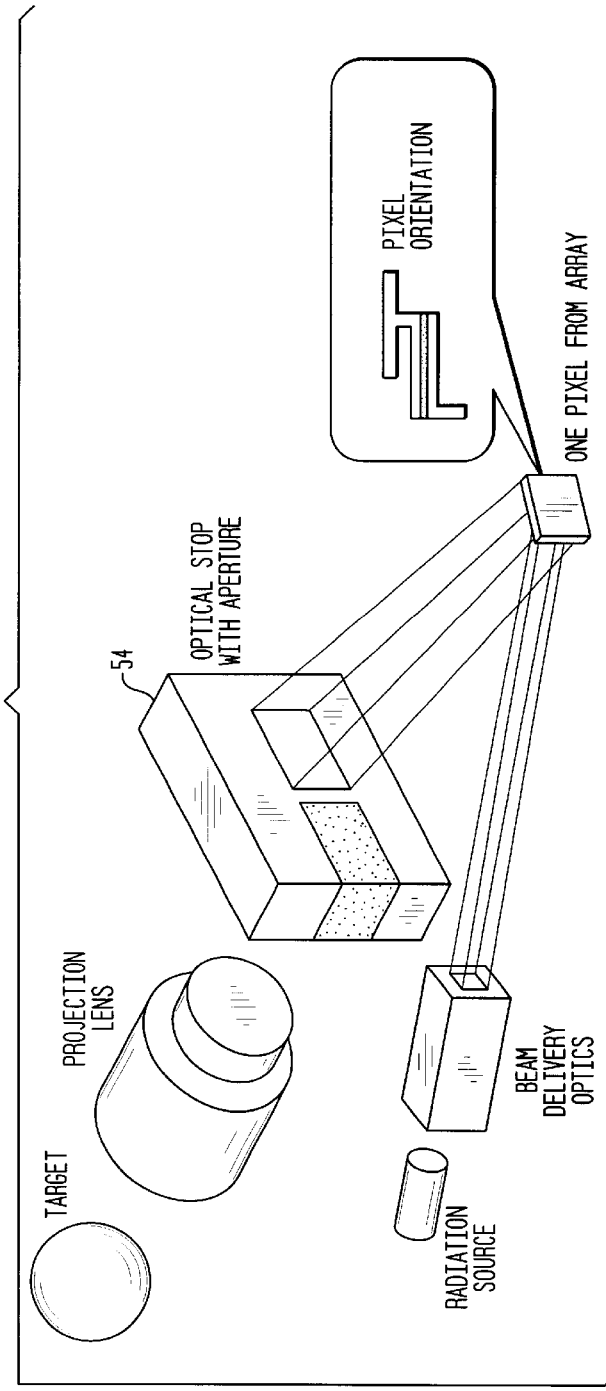
FIGS. 4A and 4B illustrate the fact that no energy is transferred when the micromirror angle is zero.
Figure 4B:
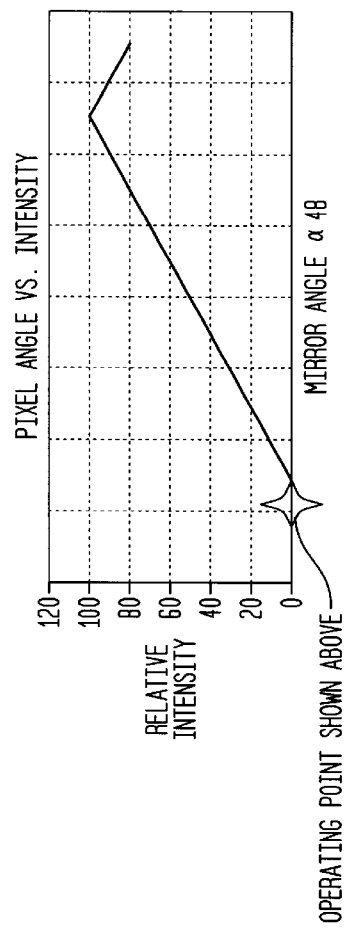
Figure 5A:
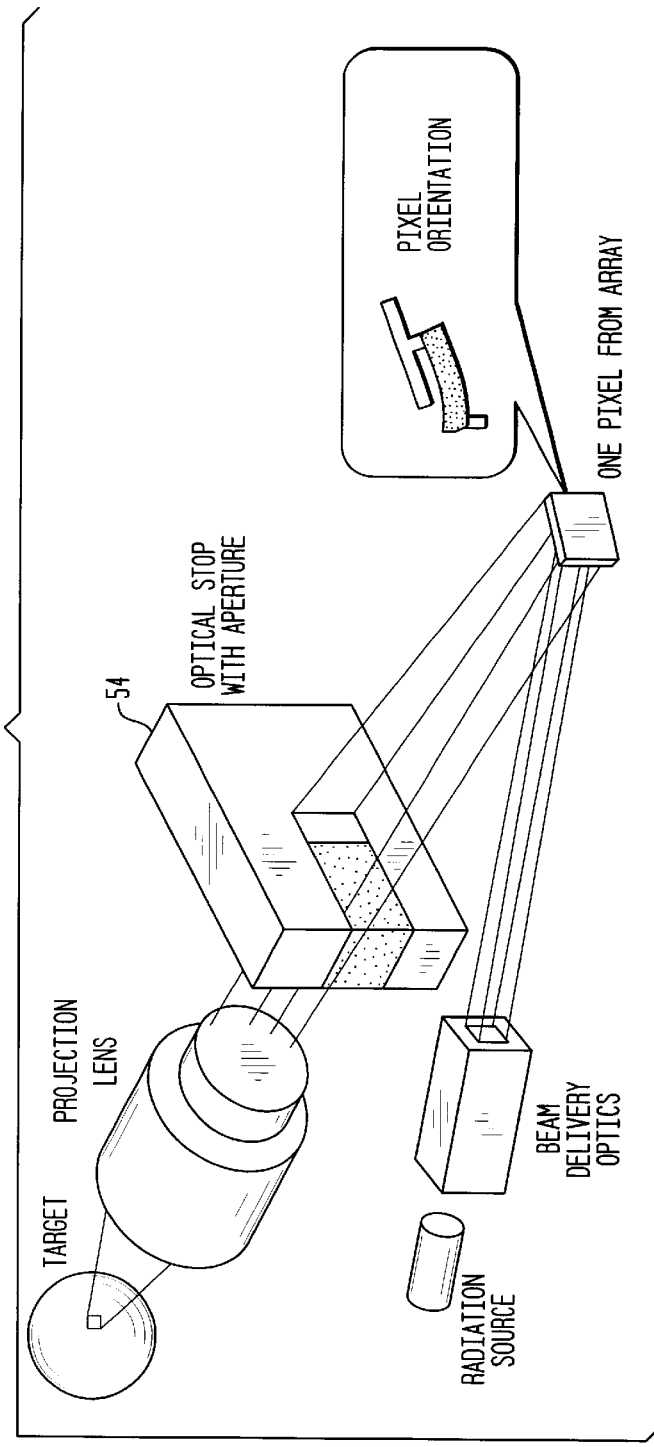
FIGS. 5A and 5B illustrate the fact that increasing energy is transferred with increasing micromirror angle.
Figure 5B:
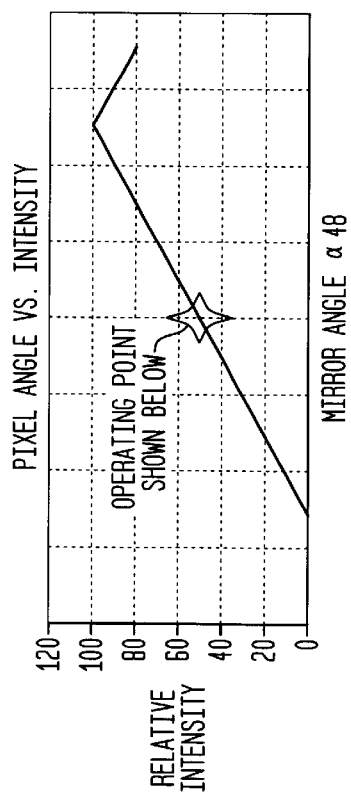

FIG. 2A shows that the tilt angle 48 of the mirror is linearly proportional to the applied voltage within the 0 to 10 volt operating range. FIG. 3 shows the relative intensity versus mirror tilt angle alpha 48, illustrating the change in laser energy applied to a work piece as the individual micromirrors are tilted to different angles. When the mirror is not tilted, the laser energy is substantially blocked from the imaging optics 18. As the mirror angle increases the amount of energy directed toward the work piece is increased, reaching a maximum at maximum tilt angle alpha 48. The laser energy applied to the work piece removes material each time the laser fires when the intensity level is above threshold. FIG. 3 shows typical corneal tissue ablation rates versus intensity levels in millijoules per square centimeter for a commercial UV excimer laser operating in the 193 nanometer wavelength region. The amount of energy that passes through to the work piece is linearly proportional to the tilt angle of each mirror as illustrated in FIGS. 4A and 4B & 5A and 5B.

For lasers operating at 308 or 206 nanometers (produced by commercially available lasers) polymetric materials are ablated with similar energy densities e.g. around 200 millijoules per square centimeter per pulse. Material removal proceeds at about 0.1 micron per pulse for polyimide. Silicon dioxide and silicon nitride require energy densities of about 600 millijoules per square centimeter for similar material removal rates.

For operation with an ultraviolet laser 26, micromirrors 12, imaging optical components 18, are constructed of known efficient UV materials and coatings to minimize losses. The thin-film micromirror array 26, package window also uses materials to minimize losses.

The present invention provides pre-selection and control of laser beam homogenization and shaping. As shown in FIG. 1, the computer 16 is provided a preselected profile by input 17, connected to the micromirror array 12 through an interface board 14, to modify the output beam energy profile of the laser 26. The micromirrors 12 are continuously moveable for reflecting varying amounts of energy from the energy source, element by element as shown in FIGS. 4A, 4B, 5A and 5B. The computer 16 is programmed by the input 17 to move the mirrors to partially reflective positions to spatially vary the laser beam energy profile.

In addition, by examining features or indices on the work piece 28, using the feature location detector and illuminator 24, information about the position and orientation of the work piece is fed into computer 16. Similarly the beam spatial profile measurement 22 provides the computer 16, with the position and orientation of the beam profile. Changes in position/orientation of the work piece are examined by computer 16 and compensated for by adjusting the micromirror array to reposition/reorient the beam energy profile relative to the work piece. This active electronic tracking system can compensate for a variety of mechanical, vibration and "run out" errors. In the case of laser eye surgery, this would be an electronic eye tracking system.

To homogenize the spatial intensity distribution of the laser beam, a beam spatial profile measurement is made 22, fed to computer 16, and compared with the desired spatial profile. The computer feeds the micromirrors 12 through an interface board 14 to set each mirror to an angle that changes the amount of energy at each pixel in accordance with the desired beam profile. To homogenize the beam, the desired profile is uniform across the beam and the mirrors are so set.

An important feature of this invention is the ability of computer 16 to monitor the laser beam profile 22 and to adjust micromirror array 12 in accordance with the desired profile as selected by the input 17. Adjustments can be rapidly made on a pulse-by-pulse basis.

Figure 6:
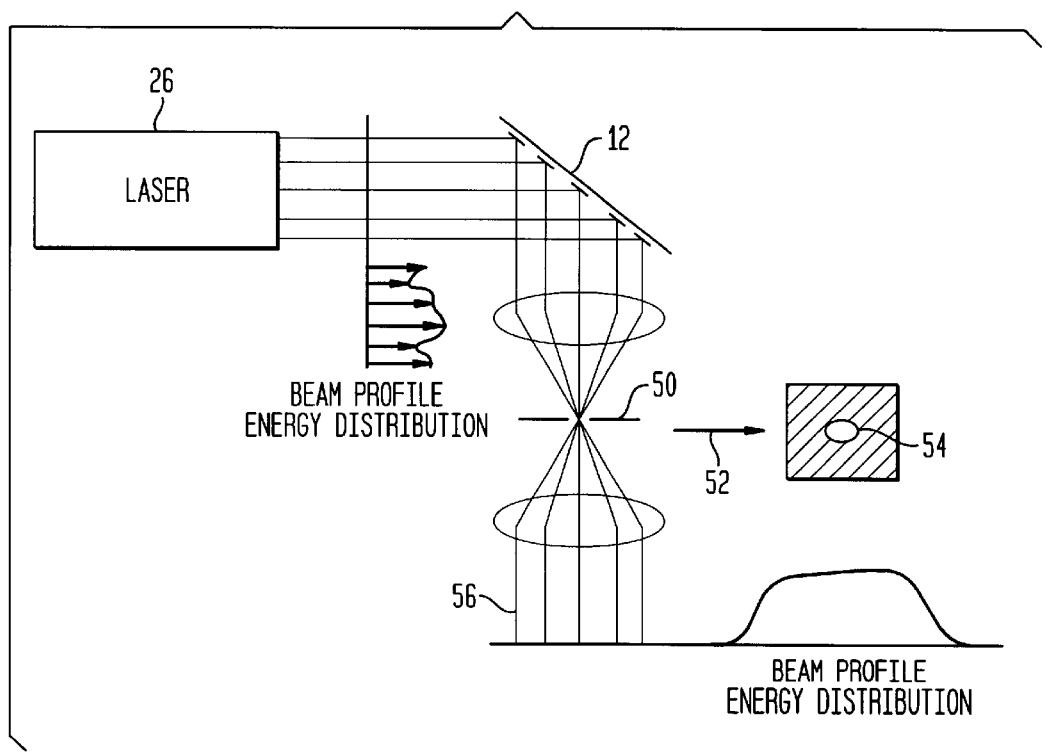
FIG. 6 is a schematic diagram of the laser Schlieren optical beam homogenizer system.
Figure 7:
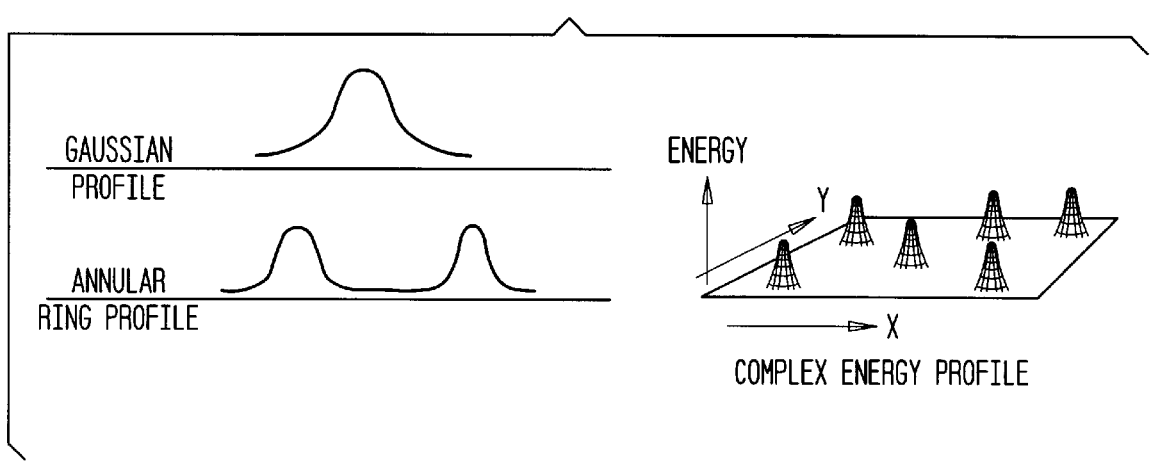
FIG. 7 illustrates the various laser beam energy patterns the apparatus in FIG. 1 can produce.
Figure 8A:
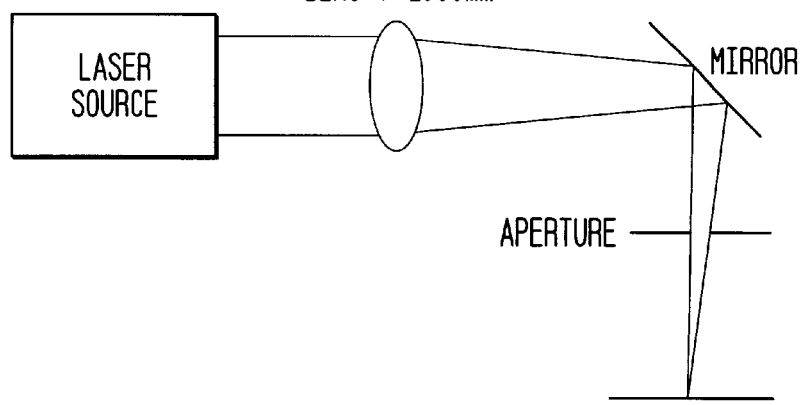
FIGS. 8A through 8F illustrate prior art beam shaping techniques.
Figure 8B:
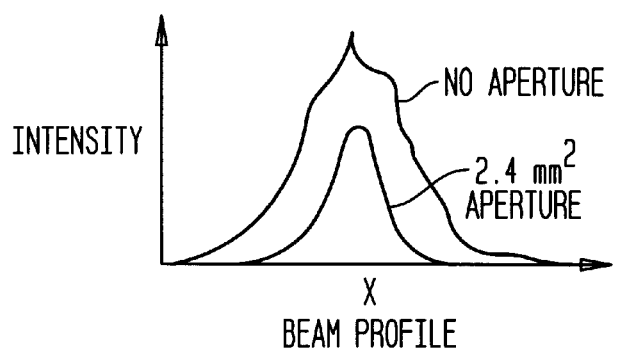
Figure 8C:
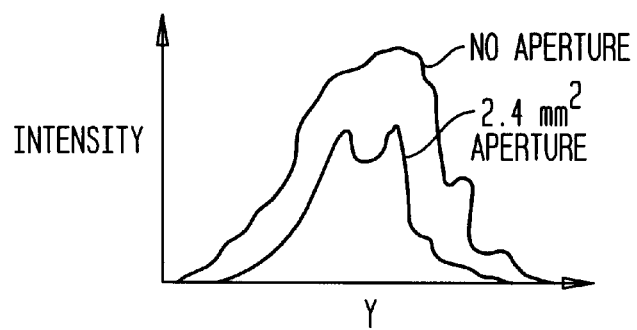
Figure 8D:
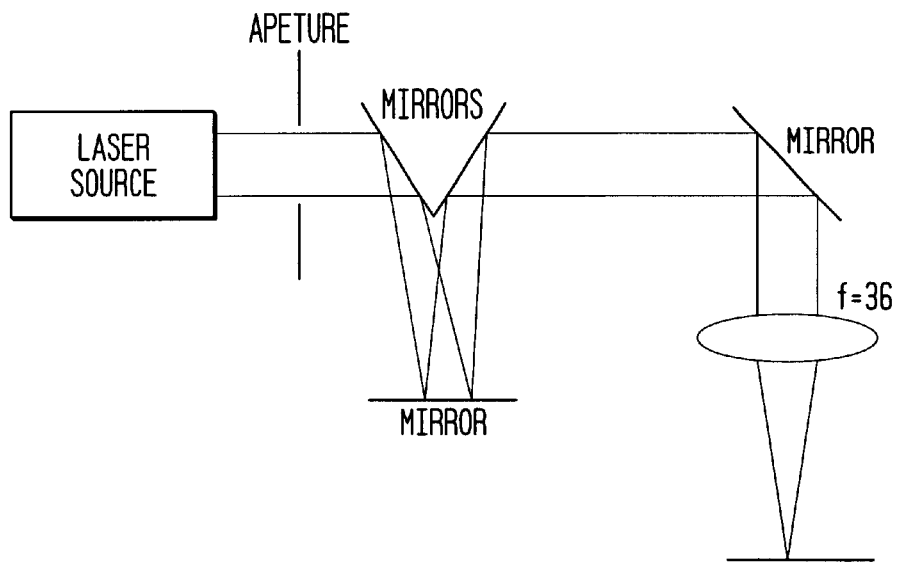
Figure 8E:
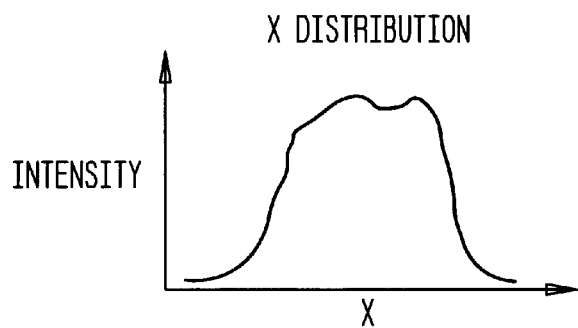
Figure 8F:
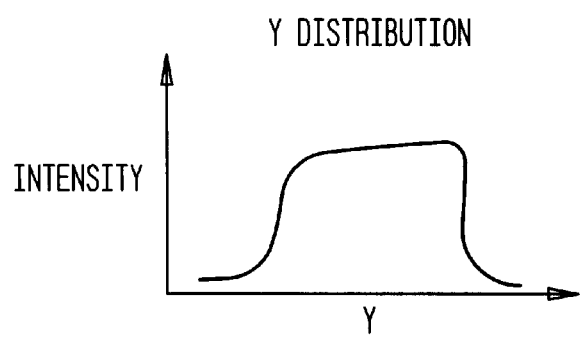

The optical system is based on Schlieren optics to control the energy intensity through continuous changes of the reflection angle of each mirror as shown in FIG. 6. In order to modulate the laser beam intensity of the individual mirror pixels, a projection stop 4, is used as a light valve. The laser energy reflected on the mirror surface forms an intensity image on the projection stop plane 52 and this image moves along the horizontal axis as the reflection angle changes. When the mirror does not tilt, all the laser beam energy passes through the aperture of the projection stop 54 and is re-imaged as the output beam 56. When the mirror is deflected to its maximum position, the laser energy for that pixel is blocked from the output by the projection stop. The amount of energy that passes through the projection stop is linearly proportional to the tilt angle alpha 48 of each mirror FIG. 1A The creation of a homogenized laser beam profile is a special case of the more general beam-forming capabilities of this invention. With a two-dimensional micro mirror array with continuously adjustable mirror positions, all beam energy profiles from a simple Gaussian shape to complex energy profiles are possible e.g. annular rings and multiple Gaussian beamlets with different peak energy intensities FIG. 7.

The simplest beam-shaping technique in common use is a simple aperture, where a variable iris is placed in the beam path to select the central portion of the beam energy. When an aperture is used in concert with imaging, more complex beam profiles can be achieved as illustrated in FIGS. 8A–8F.

To illustrate the invention, the graphs in FIGS. 3A, 3b, 4A and 4B, and 5A and 5B illustrate how beam shaping can be applied to the ablation of material. The invention, however, has broader implications for application to optical data storage, optical switching networks, nonlinear optical systems, photochemistry, micro machining, as well as materials processing. Consider the use of this invention for photolithography and material removal. One approach is to create a continuous distribution of energy at the surface of a work piece to achieve a photolithographic image or material removal with a predetermined profile. These predetermined patterns may have arbitrary shapes including non-contiguous pattern arrays, and time dependant spatial energy distribution in arbitrary patterns. Another feature is the ability to provide an electronic tracking system that maintains the geometric integrity between the desired spatial energy profile and the work piece using features as an index. It is understood that this invention maybe be also applied to various tissue modification/removal applications e.g. photorefractive keratotomy.

While the invention has been described with reference to the preferred embodiment thereof, it will be appreciated by those of ordinary skill in the art that modifications can be made to the structure and elements of the invention without departing from the spirit and scope of the invention as a whole.

What is claimed is:

1. A laser beam homogenizer and material machining apparatus for machining a surface of a work piece, said device comprising:
   - a laser beam source said beam having a given energy distribution across said beam;
   - a controllable reflecting means for controlling said energy distribution of said laser beam, said means including multiple individual reflecting surfaces for reflecting a portion of said laser beam, each of which is capable of responding to a separate control signal, a mounting surface upon which said multiple individual reflecting surfaces are mounted and a flexible reflecting surface actuator means for connecting said multiple individual reflecting surfaces to said mounting surface said reflecting surface actuator means being changeable in position in response to varying control signal;
   - energy distribution monitoring means for monitoring said energy distribution of said beam, said energy distribution monitoring means being operable on a pulse by pulse basis; and,
   - reflecting surface control means for controlling said position of said reflecting surface actuator means based on said output signal from said energy distribution monitoring means,
   - whereby said given energy distribution of said beam may be changed according to a pre-selected program.

2. A laser beam homogenizer and material machining apparatus for machining a surface of a work piece, said device comprising:
   - a laser beam source said beam having a given energy distribution across said beam;
   - a controllable reflecting means for controlling said energy distribution of said laser beam, said means including multiple individual reflecting surfaces for reflecting a portion of said laser beam, each of which is capable of responding to a separate control signal, a mounting surface upon which said multiple individual reflecting surfaces are mounted and a flexible reflecting surface actuator means for connecting said multiple individual reflecting surfaces to said mounting surface said reflecting surface actuator means being changeable in position in response to varying control signal;
   - energy distribution monitoring means for monitoring said energy distribution of said beam;
   - reflecting surface control means for controlling said position of said reflecting surface actuator means based on said output signal from said energy distribution monitoring means; and,
   - imaging optics positioned between said controllable reflecting device and said energy distribution monitoring means, said imaging optics including a focusing lens for focusing said beam, an optical projection stop comprising, an aperture for controlling the energy intensity of said beam and a projection lens for projecting said beam on to said work piece,
   - whereby said given energy distribution of said beam may be changed according to a pre-selected program and portions of said beam may be directed through said aperture by said controllable reflecting surfaces and portions of said beam may be directed away from said aperture by said controllable reflecting surfaces so as to control the energy intensity of said beam.

3. The apparatus of claim 2 further including:
   - work piece position monitoring means for monitoring the position of said work piece; and,
   - beam position control means for controlling said position of said beam based on said output signal from said work piece position monitoring means,
   - whereby the position of said beam may be adjusted so as to maintain precise tracking of said work piece.

4. The apparatus of claim 3 further including a beam splitter whereby a portion of said beam is directed to said energy distribution monitoring means, a portion of said beam is directed to said work piece position monitoring means, and the remainder of said beam passes through to said work piece.

5. The apparatus of claim 4 whereby said energy distribution monitoring means comprises a beam spatial profile measuring device.

6. The apparatus of claim 5 whereby said work piece position monitoring means comprises a feature location detector and illuminator comprising:

detecting means for detecting the location of any point on said work piece;

illuminating means for illuminating the location of any point on said work piece.

7. The apparatus of claim 6 whereby said reflecting surface control means comprises a computer.

8. The apparatus of claim 7 whereby said beam position control means comprises a computer.

9. The apparatus of claim 8 whereby the output of said computer passes through an interface board prior to being sent to said controllable reflecting device for transforming the output signal from said computer into an acceptable input control signal for said controllable reflecting device.

10. The apparatus of claim 9 whereby said reflecting surfaces of said controllable reflecting device are coated with a coating which reflects light of a wavelength corresponding to the wavelength of the light in said laser beam.

11. A method for laser beam homogenization and material machining for machining a surface of a work piece, said method consisting of the steps of:

a. generating a laser beam said beam having a given energy distribution across said beam;

b. directing said laser beam at a controllable reflecting means for controlling said energy distribution of said laser beam, said controllable reflecting means including multiple individual surfaces for reflecting a portion of said laser beam, each of which is capable of responding to a separate control signal; a mounting surface upon which said multiple individual reflecting surfaces are mounted; and, a flexible reflecting surface actuator means for connecting said multiple individual reflecting surfaces to said mounting surface said reflecting actuator means being changeable in position in response to varying control signal;

c. monitoring said energy distribution of said beam on a pulse by pulse basis; and, d. controlling said position of said reflecting surface actuator means based on the result of monitoring said energy distribution, whereby said energy distribution of said beam may be changed according to a pre-selected program.

12. A method for laser beam homogenization and material machining for machining a surface of a work piece, said method consisting of the steps of:

a. generating a laser beam said beam having a given energy distribution across said beam;

b. directing said laser beam at a controllable reflecting means for controlling said energy distribution of said laser beam, said controllable reflecting means including multiple individual surfaces for reflecting a portion of said laser beam, each of which is capable of responding to a separate control signal; a mounting surface upon which said multiple individual reflecting surfaces are mounted; and, a flexible reflecting surface actuator means for connecting said multiple individual reflecting surfaces to said mounting surface said reflecting actuator means being changeable in position in response to varying control signal;

c. monitoring said energy distribution of said beam; and, d. controlling said position of said reflecting surface actuator means based on the result of monitoring said energy distribution;

e. focusing said beam on the plane of said an optical projection stop;

f. directing said beam toward or way from said optical projection stop to control the energy intensity of said beam;

g. projecting said beam on said work lens, whereby portions of said beam may be directed through said aperture by said controllable reflecting surfaces and portions of said beam may be directed away from said aperture by said controllable reflecting surfaces so as to control the energy intensity of said beam.

13. The apparatus of claim 12 further including the steps of:

h. monitoring the position of said work piece; and, i. controlling the position of said on said output signal from said work piece position monitoring step, whereby the position of said beam may be adjusted so as to maintain precise tracking of said work piece.

14. The method of claim 13 further including using a beam splitter to perform the step of:

j. splitting said beam into at least 3 separate beams whereby a portion of said beam is made available for energy distribution monitoring, a portion of said beam is made available for work piece position monitoring, and the remainder of said beam passes through to said work piece.

15. The method of claim 14 whereby said energy distribution monitoring step consists of:

k. measuring said beam spatial profile.

16. The method of claim 15 whereby the step of monitoring the position of said work piece consists of using a feature location detector and illuminator to perform the steps of:

l. detecting the location of any point on said work piece; and, m. illuminating the location of any point on said work piece.

17. The method of claim 16 whereby the step of controlling said reflecting surface is performed by a computer.

18. The method of claim 17 whereby step of controlling said beam position is performed by a computer.

19. The method of claim 18 further including the step:

n. sending the signal from said computer through an interface board prior to being sent to said controllable reflecting device for transforming the output signal from said computer into an acceptable input control signal for said controllable reflecting device.

20. The method of claim 19 further including the step of:

o. directing said laser beam at said reflecting surfaces of said controllable reflecting device which are coated with a coating which reflects light of a wavelength corresponding to the wavelength of the light in said laser beam.

* * * * *